United States Patent

Bornhoft et al.

[11] Patent Number: 5,899,014
[45] Date of Patent: May 4, 1999

[54] METHOD FOR CONNECTING A WEIGHT TO A DECOY

[76] Inventors: Matthew Bornhoft, P.O. Box 89, Harrisburg, Ark. 72432; Joe Gatti, 122 Butterfly La., Hot Springs, Ark. 71913

[21] Appl. No.: 08/785,665

[22] Filed: Jan. 17, 1997

Related U.S. Application Data

[60] Provisional application No. 60/009,935, Jan. 16, 1996.

[51] Int. Cl.$^6$ ................................................ A01M 31/06
[52] U.S. Cl. ............................................................ 43/3
[58] Field of Search .......................... 43/2, 3; 24/711.1; 206/346

[56] References Cited

U.S. PATENT DOCUMENTS

| | | | |
|---|---|---|---|
| 364,573 | 6/1887 | Brinkop | 43/3 |
| 1,608,045 | 11/1926 | Stallman | 43/3 |
| 2,252,795 | 8/1941 | Weems et al. | |
| 2,520,233 | 8/1950 | Buehl | 43/3 |
| 2,536,736 | 1/1951 | Gazalski | 43/3 |
| 2,589,913 | 3/1952 | Wenner | 43/3 |
| 2,630,093 | 3/1953 | Toal | 43/3 |
| 2,678,778 | 5/1954 | Gibson | 43/3 |
| 2,747,814 | 5/1956 | Taylor | 43/3 |
| 2,813,363 | 11/1957 | Leckner . | |
| 3,050,895 | 8/1962 | Bratland | 43/3 |
| 3,508,303 | 4/1970 | Miyasaka | 24/711.1 |
| 3,707,023 | 12/1972 | Pfaffendorf et al. . | |
| 3,834,054 | 9/1974 | Gentry et al. . | |
| 3,930,328 | 1/1976 | Knuth | 43/3 |
| 4,656,771 | 4/1987 | Holmes | 43/3 |
| 5,172,507 | 12/1992 | Franceshini . | |
| 5,207,757 | 5/1993 | Franceshini . | |

FOREIGN PATENT DOCUMENTS

| | | | |
|---|---|---|---|
| 530650 | 9/1956 | Canada | 43/3 |
| 2679737 | 2/1993 | France | 43/3 |

OTHER PUBLICATIONS

The World Famous Big Scoop Decoy Anchor, product packaging.

*Primary Examiner*—Kurt Rowan
*Attorney, Agent, or Firm*—Mark A. Rogers; Gary N. Speed; Mark M. Henry

[57] ABSTRACT

An apparatus and method are disclosed for connecting a weight to a decoy. The cord has a deformable, resilient tab disposed on one end of the cord that is sized to allow passage of the tab through an eyelet on the decoy when the tab is compressed but to restrict passage of the tab through the eyelet when the tab is not compressed. A bead may be provided near the other end of the cord to retain a weight on the cord by restricting passage of the bead through a hole in the weight. An aperture may also be provided in the other end of the cord, preferably in the bead, to provide the flexibility of permitting a single cord to connect the weight to the decoy or to permit two or more cords to be strung together to connect the weight to the decoy. A clasp may also be provided in the end of the cord opposite the tab to provide for tangle resistant storage of the decoy, cord and weight.

5 Claims, 4 Drawing Sheets

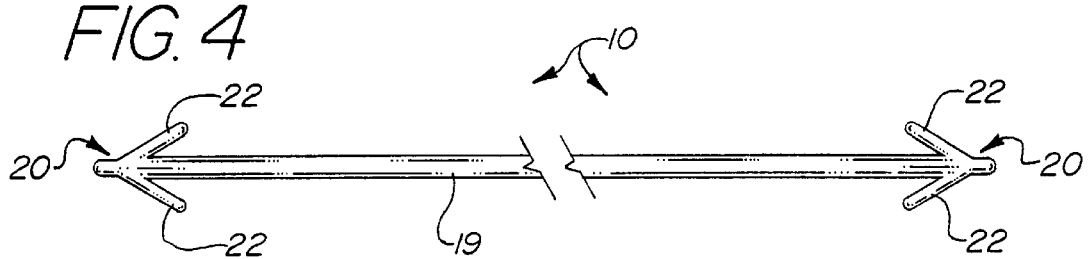
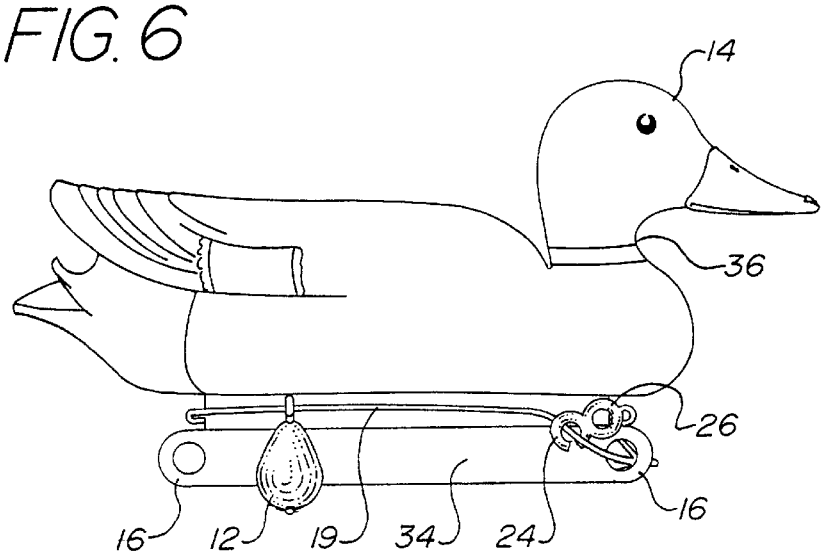

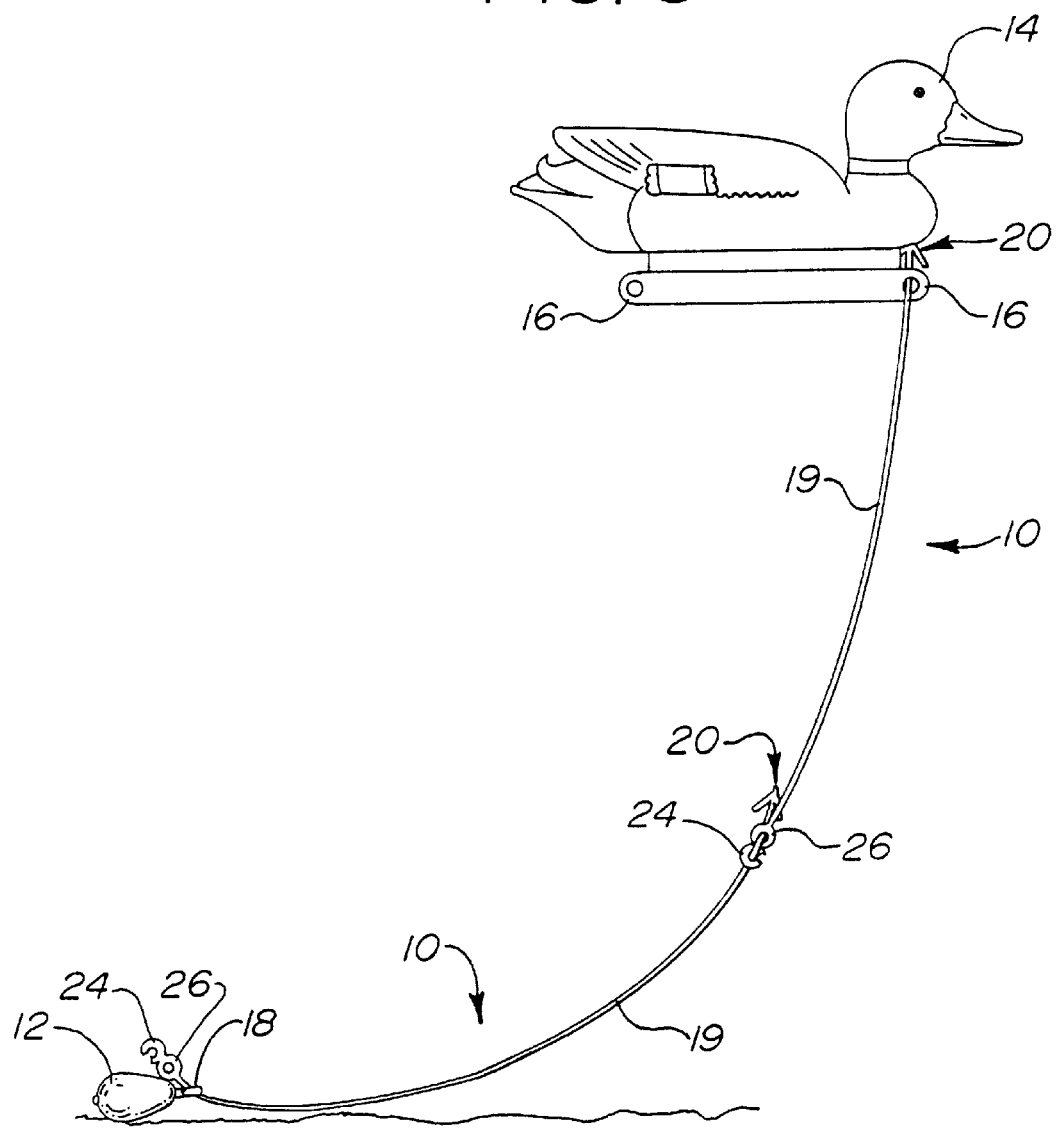

METHOD FOR CONNECTING A WEIGHT TO A DECOY

CROSS-REFERENCE TO RELATED APPLICATIONS

This is a continuation-in-part of U.S. Provisional Application No. 60/009,935, filed on Jan. 16, 1996.

BACKGROUND OF THE INVENTION

This invention relates to decoys, and more particularly, to an apparatus and method of attaching a weight to a decoy.

Decoys, such as decoys in the shape of ducks or other waterfowl or animals come in various shapes, sizes and poses, and are often used for hunting. Buoyant decoys are typically deployed in water in desired locations, numbers and arrangements in an effort to attract game to the area, typically within range of a hunter's firearm. Weights of various sizes, shapes, materials and masses are usually secured to these decoys by cords to restrict movement of the decoys in the water and to assist in keeping the decoys upright. Cords for connecting weights to decoys come in many shapes, sizes, lengths and compositions and may be formed of such things as string, twine, fishing line, rope, rubber, plastic, chain or any number of known materials. Cords provide a simple, inexpensive way of connecting a weight to a decoy by simply tying one end of a cord to the decoy and tying an opposite end of the cord to a weight.

Using cords to tie weights to decoys is not, however, without problems. For example, it is often desirable to use dozens, if not hundreds, of decoys in a desired location. Attaching weights to decoys, or stringing decoys, typically involves the time-consuming process of tying one end of the cord to the decoy, usually by passing the end of the cord through an eyelet attached to or forming part of the decoy and tying a knot in the cord, and tying the other end of the cord to the weight, usually by passing the end of the cord through a hole formed in or attached to the weight and tying a knot in the cord. Particularly when stringing a large number of decoys, the process of tying cords to decoys and weights can take hours. Also, if for any reason one decides to untie the decoys or weights, the process of untying the knots can be even more difficult and time-consuming, sometimes requiring the user to cut the cords.

When deploying a decoy in water, it is typically desirable for the cord to be of sufficient length to permit the weight to rest on the bottom of the body of water with a little slack left to permit the decoy to move about in a small area to create the appearance of swimming. If the cord is too short, the weight will not reach the bottom, and the ability of the weight to anchor the decoy and arrest movement of the decoy will be significantly diminished. Conversely, if the cord is too long, the decoy will have too much freedom of movement and may be more inclined to become entangled with other decoys or other obstacles in or around the body of water. Also, if the cord is too long, the extra slack in the cord may be prone to float to the surface of the water, making the decoy look less realistic and increasing the risk of frightening animals the user is seeking to attract. Accordingly, it is often desirable to be able to adjust the depth to which the weight may sink depending upon the depth of the water and other water conditions.

Tangling of decoy cords during storage and transport is also a problem. When decoys are not in use, they are typically stored together in large numbers in bags, boxes or other containers which are carried to and from the area in which the decoys will be used. It is fairly common for cords of different decoys to become entangled while in such storage containers, making it difficult and time-consuming to retrieve and deploy decoys when needed. Various attempts have been made to solve the problem of tangled cords, typically involving the use of weights of different shapes or compositions that enable the weights to fit over or be wrapped around different portions of the decoy for securing the weight and cord in place.

BRIEF SUMMARY OF THE INVENTION

It is therefore an object of the present invention to provide an apparatus and method of attaching a decoy to a weight that eliminates the need to tie knots in a cord.

It is a further object of the present invention to provide an apparatus and method of the above type that enables a user to quickly attach a decoy to a weight.

It is a still further object of the present invention to provide an apparatus and method of the above type that allows for quick and easy adjustment of the depth to which a weight attached to a decoy may be deployed.

It is a still further object of the present invention to provide an apparatus and method of the above type that is tangle resistant.

It is a still further object of the present invention to provide an apparatus and method of the above type that provides for quick and easy storage of a decoy, weight and cord in a tangle resistant manner.

It is a still further object of the present invention to provide an apparatus and method of the above type which uses a cord having a deformable, resilient tab to secure a cord to a decoy or weight.

It is a still further object of the present invention to provide an apparatus and method of the above type which uses a cord having a bead to secure a cord to a decoy or weight.

It is a still further object of the present invention to provide an apparatus and method of the above type which uses a clasp for securing the cord in a tangle resistant position for storage or transport of the decoy.

It is a still further object of the present invention to provide an apparatus and method of the above type in which a plurality of cords may be strung together to provide for great flexibility in easily adjusting the depth at which a weight is deployed.

Toward the fulfillment of these and other objects and advantages, the apparatus of the present invention comprises a cord for connecting a decoy to a weight. The cord has a deformable, resilient tab disposed on one end of the cord that is sized to allow passage of the tab through an eyelet on the decoy when the tab is compressed but to restrict passage of the tab through the eyelet when the tab is not compressed. A bead may be provided near the other end of the cord to retain a weight on the cord by restricting passage of the bead through a hole in the weight. An aperture may also be provided in the other end of the cord, preferably in the bead, to provide the flexibility of permitting a single cord to connect the weight to the decoy or to permit two or more cords to be strung together to connect the weight to the decoy. A clasp may also be provided in the end of the cord opposite the tab to provide for tangle resistant storage of the decoy, cord and weight.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein:

FIG. 4 is an overhead view of an alternate embodiment of the present invention;

FIG. 5 is a side elevational view of an alternate embodiment of the present invention; and FIG. 6 is an enlarged, partial side elevation view of a cord of the present invention securing a weight to a decoy in a tangle resistant storage or transport position.

DETAILED DESCRIPTION OF THE INVENTION

Figure 1:
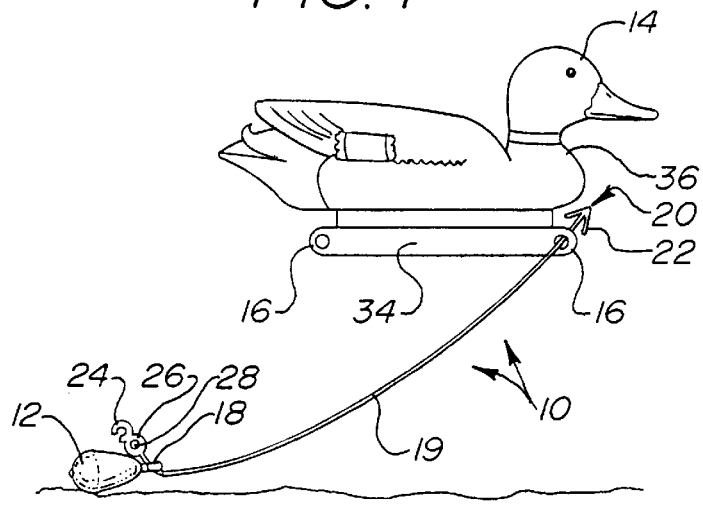
FIG. 1. is a side elevation view of a cord of the present invention connecting a weight to a decoy.

Referring to FIG. 1, the reference numeral 10 refers in general to a cord of the present invention, used to connect a weight 12 to a decoy 14. The cord 10 is connected to a decoy 14 using an eyelet 16 that is attached to or forms part of the decoy 14 and is connected to the weight 12 using a hole 18 attached to or forming part of the weight 12.

Figure 2:
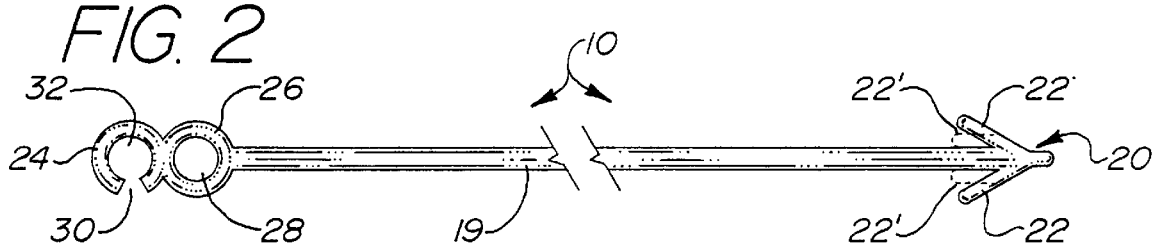
FIG. 2 is an overhead view of a preferred embodiment of the present invention.

As best shown in FIG. 2, and for reasons to be described, the cord 10 has an elongate midsection 19 and a deformable, resilient tab 20 having at least one leg 22 at or near one end of the midsection 19 of the cord 10. A clasp 24 and a bead 26 having an aperture 28 are disposed at or near the other end of the midsection 19 of the cord 10. The tab 20 is sized so that when it is compressed, such as by moving leg 22 to a position similar to that shown by 22' in FIG. 2, the tab 20 may pass through the hole 18 and eyelet 16, as well as through aperture 28 or a similar aperture 28 of a second cord 10, but so that the tab 20 restricts passage of the tab through the hole 18, eyelet 16 or aperture 28 or other aperture 28 when the tab 20 is not compressed. Each leg 22 has a length that is preferably substantially within a range of approximately 1/8 inches to approximately 1.5 inches, more preferably substantially within a range of approximately 1/4 inches to approximately 1 inch, and most preferably substantially within a range of approximately 1/2 inches to 3/4 inches. Each leg 22 has a distal and a proximal end, and the proximal end is disposed near an axis of the midsection 19 of the cord 10 and is aligned so that the leg 22 forms an acute angle with the axis of the cord. When more than one leg 22 is used, as shown in the alternate embodiments depicted in FIGS. 4-7, the two acute angles are substantially equal to each other, and the tab 20 is substantially V-shaped. The angles are preferably substantially within a range of approximately 10 degrees to approximately 90 degrees, are more preferably substantially within a range of approximately 20 degrees to approximately 40 degrees and are most preferably approximately 30 degrees.

It is understood that, although the tab 20 is described as being V-shaped, it may take any number of forms. For example, the legs 22 may be aligned perpendicular to an axis of the midsection 19 of the cord 10 so that the tab 20 is substantially I-shaped. The tab 20 may be spherical, semispherical, elliptical or may take any number of shapes so long as the tab may be compressed to a configuration that permits the tab to pass through an eyelet 16, hole 18, or aperture 28 and so long as, upon release, the tab returns to a shape or configuration that restricts passage of the tab through the same.

The cord 10 is preferably made from polypropylene but may be made from any number of materials, such as string, twine, fishing line, rope, wire, chain, various blends and compounds of rubbers or plastics, as well as any number of other known materials. Also, the cord 10 need not be made from the same material over its entire length. For example, string may be used for a midsection 19 of the cord 10 and polypropylene may be used for end portions having the tab 20, bead 26 and clasp 24. The midsection 19 of the cord 10 preferably has a diameter substantially within a range of approximately 1/32 inches to approximately 1/4 inches, more preferably substantially within a range of approximately 1/16 inches to approximately 3/16 inches and is most preferably approximately 1/8. Of course, it is understood that the cord need not have a circular cross-section and need not have the same shape or diameter throughout its entire length.

The ring shaped bead 26 having a circular aperture 28 is disposed near the other end of the cord 10. The bead 26 is sized to restrict passage of the bead through the hole 18 in the weight 12, the eyelet 16 of the decoy 14, the aperture 28 or through an aperture 28 in a bead 26 of another cord 10, thereby restricting passage of the bead end of the cord 10 through the hole 18, eyelet 16, aperture 28 or aperture 28 of another cord 10. The bead 26 has an outer diameter that is preferably substantially within a range of approximately 1/4 inches to approximately 3/4 inches, more preferably substantially within a range of approximately 3/8 inches to approximately 5/8 inches and is most preferably approximately 7/16 inches. The bead 26 may, but need not, be deformable or resilient to permit passage through eyelet 16, hole 18, aperture 28 or another aperture 28 when the bead 26 is compressed. Although the preferred bead 26 is described as being ring shaped, the bead is simply an area on the cord having an enlarged cross section area and may take any number of forms, shapes and sizes, including such things as a knot or a solid or hollow body having any number of shapes. As shown in FIG. 4, a second tab 20 may be used in place of the bead 26 or clasp 24, and each tab 20 may have more than one leg 22.

The aperture 28 is sized to allow passage of tab 20 or a tab of another cord 10 through the aperture when tab is compressed but to restrict passage of the tab through the aperture when the tab is not compressed. The aperture 28 has an inner diameter that is preferably substantially within a range of approximately 1/8 inches to approximately 3/8 inches, more preferably substantially within a range of approximately 3/16 inches to approximately 5/16 inches, and is most preferably approximately 1/4 inches.

The clasp 24 is secured to the cord 10 near the bead 26. A throat 30 of the C-shaped clasp 24 is sized to permit a portion of the midsection 19 of the cord 10 to pass therethrough into an opening 32 defined by inner walls of the clasp 24. The throat 30 is preferably smaller than the diameter of the midsection 19 of the cord 10 so that opposite sides of the throat 30 must be forced at least slightly apart for a diameter of the midsection 19 of the cord 10 to pass therethrough, thereby enhancing the ability of the clasp 24 to releasably retain the midsection 19 of the cord 10 within the opening 32 for tangle resistant storage or transport. The clasp 24 is preferably made of the same deformable, resilient material as the tab 20 and bead 26. The clasp 24 may, but need not, be deformable or resilient to permit passage through eyelet 16, hole 18, aperture 28 or another aperture 28 when the clasp 24 is compressed. The opening 32 of the clasp 24 has an inner diameter that is preferably substantially within a range of approximately ⅛ inches to approximately ⅜ inches, more preferably substantially within a range of approximately 3/16 inches to approximately 5/16 inches, and is most preferably approximately ¼ inches. Of course, any number of shapes, sizes or materials may be used to releasably retain a portion of the cord 10 within the clasp 24 for releasably securing the clasp end of the cord in place to resist unwrapping.

As shown in FIG. 1, eyelets may be disposed at any number of locations about the decoy body, and it is understood that an eyelet 16 as the term is used herein need not take the form of a ring but may take any number of shapes and sizes and may generally be any passageway, hole, opening, ring, or aperture that may be used for attachment of a cord 10 to a decoy 14. Similarly, the hole 18 in the weight 12 as the term hole is used herein need not take the form of a hole passing through the body of the weight but may take any number of shapes or sizes and may generally be any passageway, hole, opening, ring, eyelet or aperture that is typically used for attachment of a cord 10 to a weight 12.

Referring to FIG. 1, the cord 10 may be used to quickly connect a weight 12 to a decoy 14 without the need to tie knots. In operation, a user compresses tab 20 and passes the compressed tab 20 through hole 18 and then passes the compressed tab 20 through eyelet 16. Of course, a user need not hold the tab 20 in the compressed position from start to finish but may release the tab 20 as desired and compress the tab as needed to pass the tab through the hole 18 and eyelet 16. Also, the shape of the tab is preferably such that when the pointed end of the tab is placed in proper alignment and in contact and with walls of the eyelet 16, aperture 28 or hole 18 and pushed, the walls of the eyelet 16, aperture 28 or hole 18 can compress the tab 20, permitting the tab to pass therethrough. After passing through the aperture 28, the tab 20 is released and returns to a shape that restricts passage of the tab in the opposite direction through the aperture 28. Upon completion, the tab 20 is disposed near the decoy 14 and eyelet 16, and the bead 26, aperture 28 and clasp 24 are disposed near the weight 12 and hole 18.

Alternatively, the above steps may be reversed so that the compressed tab 20 is passed first through the eyelet 16 and then through the hole 18 and so that, upon completion, the bead 26, aperture 28 and clasp 24 are disposed near the decoy 14 and eyelet 16, and the tab is disposed near the weight 12 and hole 18. As another alternative, the compressed tab 20 may be passed first through the eyelet 16, then through the aperture 28 to form a loop and then through the hole 18. After forming the loop, the user may pull on the tab end of the cord 10 to tighten the loop about eyelet 16. Similarly, the user may reverse the order and may compress the tab 20 and pass the compressed tab 20 sequentially through the hole 18, the aperture 28 and the eyelet 16 so that the loop, bead 26, aperture 28 and clasp 24 are disposed near the weight 12 and the tab 20 is disposed near the eyelet 16. Of course, the cord 10 may be connected to the weight 12 and decoy 14 in any number of ways and combinations.

As shown in FIG. 5, if a user wishes to use more than one cord 10 to permit the weight 12 to be deployed to a greater depth, the user takes a first cord 10, compresses the tab 20 and passes the compressed tab through the eyelet 16. The user also compresses the tab 20 of the second cord 10 and passes the compressed tab 20 through the hole 18 and then through the aperture 28 of the first cord 10. The first cord 10 may be connected to the decoy 14 in the above manner before or after the second cord 10 is connected to the first cord. In similar fashion, as many cords as desired may be used to connect the weight 12 to the decoy 14. For example, to use three cords, the first cord 10 could be attached to the decoy 14 as described above. The tab 20 of the second cord 10 could then be compressed and passed through the aperture 28 of the first cord, and the tab 20 of the third cord could be compressed and passed through the hole 18 and then through the aperture 28 of the second cord. Again, the order may be reversed so that the first cord is attached to the weight 12 and the third cord is attached to the decoy 14.

Figure 7:
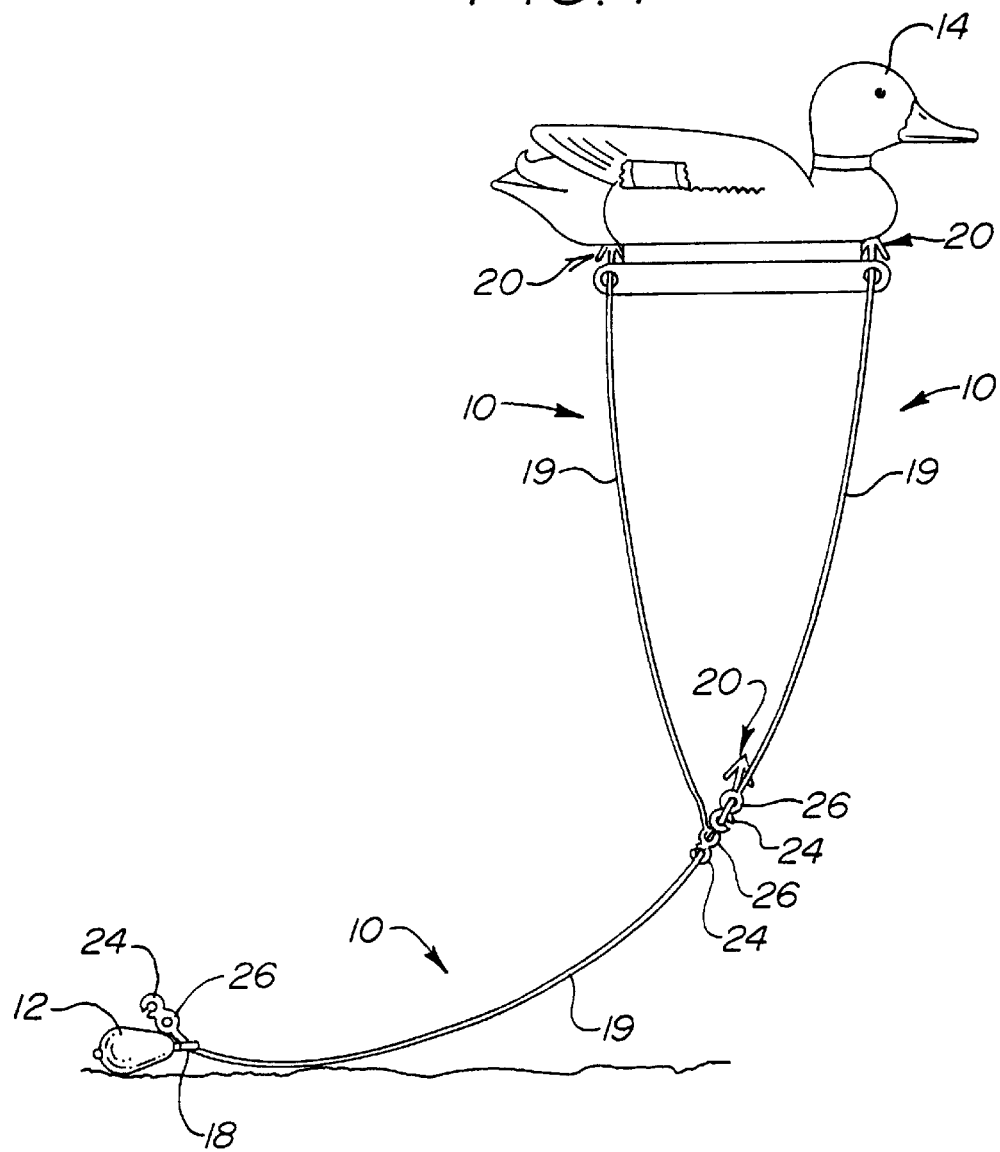
FIG. 7 is an alternate embodiment of the invention.
Figure 8:
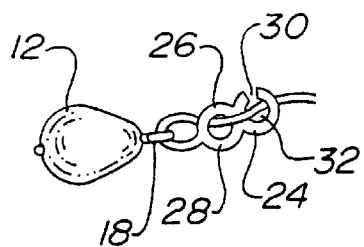
FIG. 8 is an enlarged side view of an alternate embodiment of the invention.

As further illustrated in FIGS. 7 and 8, the cords may be connected to the weight 12 and decoy 14 and to each other in any number of ways and combinations. For example, it is occasionally desirable to secure cords 10 to front and rear eyelets 16 such as to prevent the front or rear of the decoy from tossing about excessively in rough waters or windy conditions. FIG. 7 illustrates one possible configuration of obtaining this configuration. FIG. 8 also illustrates another manner of securing a weight 12 to a cord 10, in which the tab 20 is passed through the hole 18 in the weight, looped back through aperture 28 in the bead 26 and further secured using the clasp 24. The tab 20 could then be passed through the eyelet 16 of the decoy 14. Of course, the decoy 14 and weight 12 could be switched and the same procedure carried out to first secure the decoy 14 to the cord 10 and then to pass the tab 20 through the hole 18 in the weight 12.

As best shown in FIG. 6, to place the cord 10 in a tangle resistant position for storage or transport, the user slides the weight 12 up or along the midsection 19 of the cord 10 until it is disposed near the eyelet 16, and winds or wraps the cord around a portion of the decoy 14, such as around the keel 34 or neck 36 portion of the decoy 14, until only a short portion of the cord near the clasp 24 remains unwrapped. The user then manipulates the clasp 24 to pass a wrapped portion of the midsection 19 of the cord 10 through the throat 30 of the clasp to releasably secure the clasp end of the cord in place to keep the cord from unwrapping.

Figure 3:
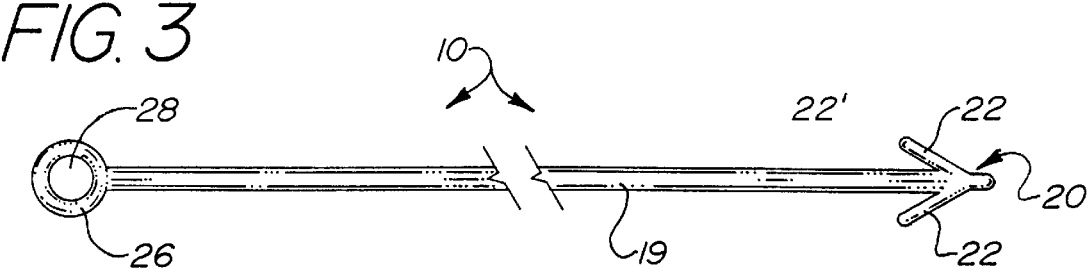
FIG. 3 is an overhead view of an alternate embodiment of the present invention.

In an alternate embodiment as shown in FIG. 3, the clasp may be omitted, and the cord or cords may be used to connect a weight 12 to a decoy 14 in the same ways as a cord or cords having a clasp. To store the cord in a tangle resistant position, after wrapping the midsection 19 of the cord 10 around the decoy, the bead 26 is tucked under and around a wrapped portion of the midsection 19 of the cord 10. In another alternative embodiment as shown in FIG. 4, a cord 10 having tabs at both ends may be used, one tab 20 being compressed, passed through eyelet 16 and released and the tab 20 at the opposite end of the cord being compressed, passed through the hole 18 and released. Similarly, to store the cord in a tangle resistant position, the midsection 19 of the cord 10 is wrapped around the decoy and one of the tabs 20 is tucked under and around a wrapped portion of the midsection 19 of the cord 10.

Other modifications, changes and substitutions are intended in the foregoing, and in some instances, some features of the invention will be employed without a corresponding use of other features. For example, although the cord 10 is described as having a tab 20 at one end and a bead 26, an aperture 28 and clasp 24 at the other end, the tab 20, bead 26, aperture 28 and clasp all need not be used or may be used in any combination. Further, the tab 20 need not be deformable or resilient, as long as the tab is movable between a first position that permits passage of the tab through the aperture 28 or hole 18 and a second position in which the tab restricts passage of the tab through the aperture or hole. Further still, the aperture 28 need not be disposed in the bead 26 and need not be circular. Also, given the great number of combinations in which one or more of the above cords may be used to connect a weight 12 to a decoy 14, the methods and combinations described above are merely the preferred combinations and are merely representative examples of the ways in which the cords may be attached to the decoy 14, the weights or each other. Further, the sizes, shapes, lengths, diameters and other dimensions are given by way of example and should not be read as limiting the scope of the invention. Further still, although the invention is described and depicted as used in connection with a decoy typically used for hunting, the invention may be used to connect other objects to weights. Accordingly, it is appropriate that the appended claims be construed broadly and in a manner consistent with the scope of the invention.

What is claimed is:

1. A method of securing a decoy to a weight, comprising:
   (a) providing a decoy having an eyelet, a weight having a hole and a cord having a deformable, resilient tab near a first end and having a bead near a second end, said bead having an aperture passing therethrough;
   (b) compressing said tab;
   (c) passing said compressed tab through said eyelet in said decoy or said hole in said weight;
   (d) passing said compressed tab through said aperture in said bead to form a loop;
   (e) after forming said loop, passing said compressed tab through the other of said eyelet in said decoy or said hole in said weight; and
   (f) releasing said tab after step (e) to permit said tab to return to an uncompressed shape.

2. The method of claim 1 wherein:
   step (a) comprises providing a decoy having an eyelet, a weight having a hole and a cord having a deformable, resilient tab near a first end and having a bead and a clasp near a second end, said bead having an aperture passing therethrough;
   step (c) comprises passing said compressed tab through said eyelet in said decoy;
   step (e) comprises, after forming said loop, passing said compressed tab through said hole in said weight;
   and further comprising:
   (g) after step (f), wrapping said cord around a portion of said decoy; and
   (h) securing said clasp to a portion of said wrapped cord.

3. The method of claim 1 wherein:
   step (a) comprises providing a decoy having an eyelet, a weight having a hole and a cord having a deformable, resilient tab near a first end and having a bead and a clasp near a second end, said bead having an aperture passing therethrough;
   step (c) comprises passing said compressed tab through said eyelet in said decoy;
   step (e) comprises, after forming said loop, passing said compressed tab through said hole in said weight;
   and further comprising:
   (g) after step (f), sliding said weight along said cord until it is disposed near said eyelet;
   (h) after step (g), wrapping said cord around a portion of said decoy; and
   (i) securing said clasp to a portion of said wrapped cord.

4. A method of securing a decoy to a weight comprising:
   (a) providing a decoy having an eyelet, a weight having a hole and a cord having a deformable, resilient tab near a first end and having a bead and a clasp near a second end;
   (b) compressing said tab;
   (c) passing said compressed tab through said eyelet in said decoy or said hole in said weight;
   (d) passing said compressed tab through the other of said eyelet in said decoy or said hole in said weight; and
   (e) releasing said tab after step (d) to permit said tab to return to an uncompressed shape;
   (f) after step (e), wrapping said cord around a portion of said decoy; and
   (g) securing said clasp to a portion of said wrapped cord.

5. A method of securing a decoy to a weight comprising:
   (a) providing a decoy having an eyelet, a weight having a hole and a cord having a deformable, resilient tab near a first end and having a bead and a clasp near a second end;
   (b) compressing said tab;
   (c) passing said compressed tab through said eyelet in said decoy or said hole in said weight;
   (d) passing said compressed tab through the other of said eyelet in said decoy or said hole in said weight; and
   (e) releasing said tab after step (d) to permit said tab to return to an uncompressed shape;
   (f) after step (e), sliding said weight along said cord until it is disposed near said eyelet;
   (g) after step (f), wrapping said cord around a portion of said decoy; and
   (h) securing said clasp to a portion of said wrapped cord.

* * * * *